United States Patent [19]

Ogura et al.

[11] Patent Number: 4,707,059

[45] Date of Patent: Nov. 17, 1987

[54] INTEGRATED OPTICAL CIRCUIT ELEMENT AND METHOD OF MAKING THE SAME

[75] Inventors: Shigetaro Ogura, Tama; Yuichi Handa, Tokyo, both of Japan

[73] Assignee: Canon Kabushiki Kaisha, Tokyo, Japan

[21] Appl. No.: 565,367

[22] Filed: Dec. 27, 1983

[30] Foreign Application Priority Data

Dec. 29, 1982 [JP] Japan .................... 57-231531

[51] Int. Cl.$^4$ .................................. G02B 6/12
[52] U.S. Cl. ......................... 350/96.13; 350/96.12; 350/96.14; 350/96.19
[58] Field of Search ............... 350/96.11, 96.12, 96.13, 350/96.14, 96.19, 162.17, 162.20

[56] References Cited

U.S. PATENT DOCUMENTS

| | | | |
|---|---|---|---|
| 3,877,784 | 4/1975 | Lin ........................... | 350/96.13 X |
| 4,076,381 | 2/1978 | Hammer .................... | 350/96.14 |
| 4,227,769 | 10/1980 | Phillips et al. ............ | 350/96.19 |
| 4,455,064 | 6/1984 | Kenan ....................... | 350/96.13 |

OTHER PUBLICATIONS

Wood et al, "Holographic Formation of Gratings in Optical Waveguiding Layers", *J. Appl. Physics*, vol. 46, No. 3, Mar. 1975, pp. 1214–1215.
Pun et al, "Efficient Waveguide Bragg-Deflection Grating on LiNbO$_3$", *Electronics Lett.*, vol. 18, No. 17, Aug. 1982, pp. 740–742.
Jackel et al, "Proton Exchange for High-Index Waveguides in LiNbO$_3$", *Appl. Phys. Lett.*, vol. 41, No. 7, Oct. 1982, pp. 607–608.
Dakss et al, "Grating Coupler for Efficient Excitation of Optical Guided Waves . . . ", *Appl. Phys. Lett.*, vol. 16, No. 12, Jun. 1970, pp. 523–525.
Kuhn et al, "Deflection of an Optical Guided Wave by a Surface Acoustic Wave", *Appl. Phys. Lett.*, vol. 17, No. 6, Sep. 1970, pp. 265–267.

*Primary Examiner*—John Lee
*Attorney, Agent, or Firm*—Fitzpatrick, Cella, Harper & Scinto

[57] ABSTRACT

This specification discloses an integrated optical circuit element comprising a substrate, a wave guide layer formed on the substrate and having a refractive index higher than that of the substrate, and a photocoupler which is a diffraction grating pattern formed in the wave guide layer and having the same refractive index as that of the substrate. The specification also discloses a method of making an integrated optical circuit element which comprises the steps of forming a mask of diffraction grating pattern on a substrate, forming a layer having a refractive index higher than that of the substrate in a portion of the substrate which is not covered by the mask, and removing the mask.

5 Claims, 11 Drawing Figures

INTEGRATED OPTICAL CIRCUIT ELEMENT AND METHOD OF MAKING THE SAME

BACKGROUND OF THE INVENTION

1. Field of the Invention

This invention relates to an integrated optical circuit element for realizing a functional element such as a light deflector or a light modulator and to a method of making the same.

2. Description of the Prior Art

As a method of introducing a light from outside into a wave guide forming an integrated optical circuit or leading the light propagated through the wave guide out of the wave guide, there is known a prism coupler, a butt coupler for introducing a light from the polished end surface of a wave guide directly into the wave guide, etc. The prism coupler is simplest in construction, but prisms are expensive and when the prisms are to be coupled together, a jig or the like for urging the prisms against the wave guide juts out from the integrated optical circuit element, and this provides a great impediment in making the element small in size and low in cost. On the other hand, to introduce a light directly into the end surface of the wave guide by a butt coupling, it is necessary to set the light in the end surface of the wave guide at accuracy of the order of sub-microns and this makes it unavoidable to use a very expensive movable rotatable stage capable of effecting fine adjustment in the directions of three x, y and z axes. Also, polishing of the end surface of a thin substrate is difficult and expensive. Accordingly, like the prism coupler, the butt coupler is not desirable for realization of small and inexpensive elements.

As a means for overcoming the above-noted disadvantages, a photocoupler utilizing a planar type diffraction grating has been proposed (M. L. Dakss et al., *Applied Physics Letters* 16(12), 523 (1970): Grating Coupler For Efficient Excitation of Optical Guided Waves in Thin Films). An example of a light deflector using such diffraction grating type photocouplers is shown in FIG. 1 of the accompanying drawings. In FIG. 1, there is formed on a substrate 1 a wave guide 2 having a refractive index higher than that of the substrate, and diffraction grating type photocouplers $3_1$ and $3_2$ are formed in the wave guide 2. An incident light 4 having entered at a suitable angle is introduced into the wave guide 2 by the photocoupler $3_1$, is propagated therethrough as a propagated light 5 and is led out of the wave guide as an emergent light 6 by the photocoupler $3_2$. An MTS array (multiple tilted SAW transducer array) 7 comprising a plurality of interdigital transducers (hereinafter referred to as IDTs) which generate surface acoustic waves (hereinafter referred to as SAWs) different in wavelength is formed on the wave guide 2. When RF power is supplied to the MTS array 7 to excite SAWs 8 from the respective IDTs and the propagated light 5 is Bragg-diffracted, a diffracted light 9, like the emergent light 6, is led out of the photocoupler $3_2$ and this can be used, for example, for the switching between two levels.

The construction of the diffraction grating type photocoupler in the integrated optical circuit element of the prior art as described above will now be described by reference to FIGS. 2A and 2B of the accompanying drawings. FIGS. 2A and 2B correspond to the cross-section taken along the line A-A' in FIG. 1. In the example shown in FIG. 2(A), a wave guide 12 is formed on a substrate 11 and grids 10 formed, for example, of a dielectric material are mounted on the wave guide 12 to thereby form a diffraction grating. However, such a mounted type photocoupler has suffered from a disadvantage that the coupling efficiency of light, namely, the rate of the light introduced into the wave guide to the incident light or the rate of the emergent light to the propagated light, is very low.

Also, in the photocoupler shown in FIG. 2(B), a wave guide 22 formed of a photosensitive material is formed on a substrate 21 as by sputtering and a part of the wave guide is exposed to light to thereby make a volume type diffraction grating. An integrated optical circuit element using such a photocoupler can obtain a coupling efficiency higher than that obtained by the example of FIG. 2(A), but has suffered from a disadvantage that the wave guide is liable to peel off the substrate or the photosensitivity of the wave guide may vary with time and the element does not stand long use.

Further, in the integrated optical circuit elements of the prior art as shown in FIGS. 2(A) and 2(B), when an electrode is to be formed on the wave guide like the MTS array 7 of FIG. 1, for example, it must be formed independently of the photocoupler, and this has led to an increased number of element manufacturing steps and an increased cost of manufacture.

SUMMARY OF THE INVENTION

It is an object of the present invention to provide an integrated optical circuit element in which the coupling efficiency of incident and emergent lights is high and which stably functions for a long period of time and a method of making the same.

It is another object of the present invention to provide a method of inexpensively making an integrated optical circuit element in which the coupling efficiency of incident and emergent lights is high and which stably functions for a long period of time.

The present invention achieves the above objects by an integrated optical circuit element comprising a substrate, a wave guide layer formed on the substrate and having a refractive index higher than that of the substrate, and a photocoupler which is a diffraction grating pattern formed in the wave guide layer and having the same refractive index as that of the substrate, and a method of making the same.

The invention will become more fully apparent from the following detailed description thereof taken in conjunction with the accompanying drawings.

DESCRIPTION OF THE PREFERRED EMBODIMENT

Figure 1:
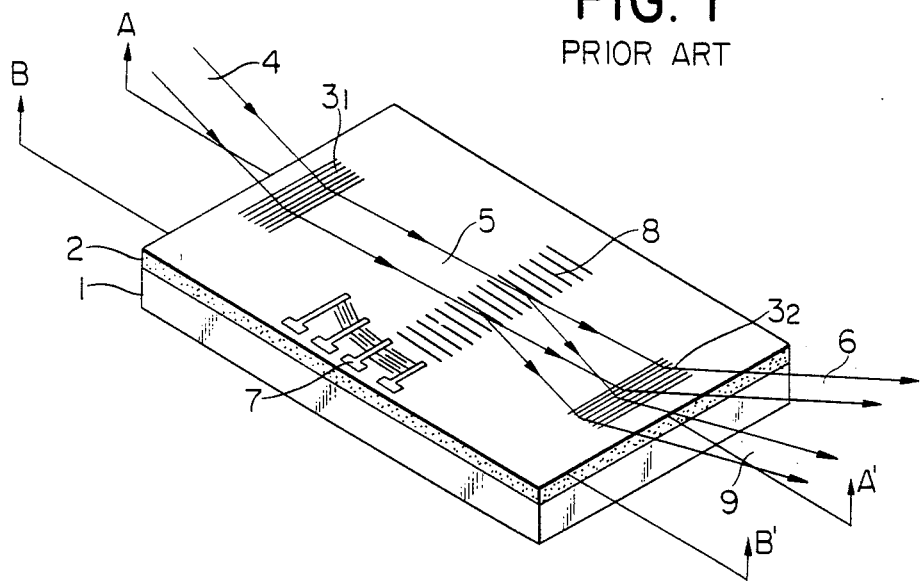
FIG. 1 shows an example of a light deflector using diffraction grating type photocouplers according to the prior art.
Figure 2A:
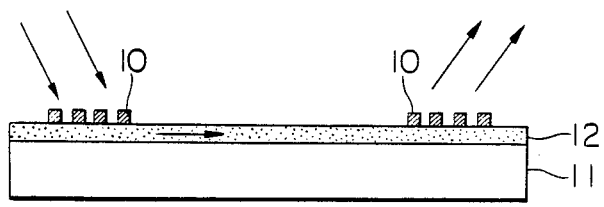
FIGS. 2(A) and 2(B) show examples of the construction of the diffraction grating type photocoupler in the integrated optical circuit element according to the prior art.
Figure 2B:
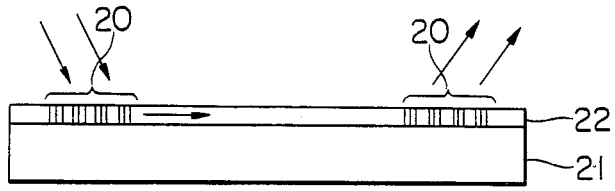
Figure 3:
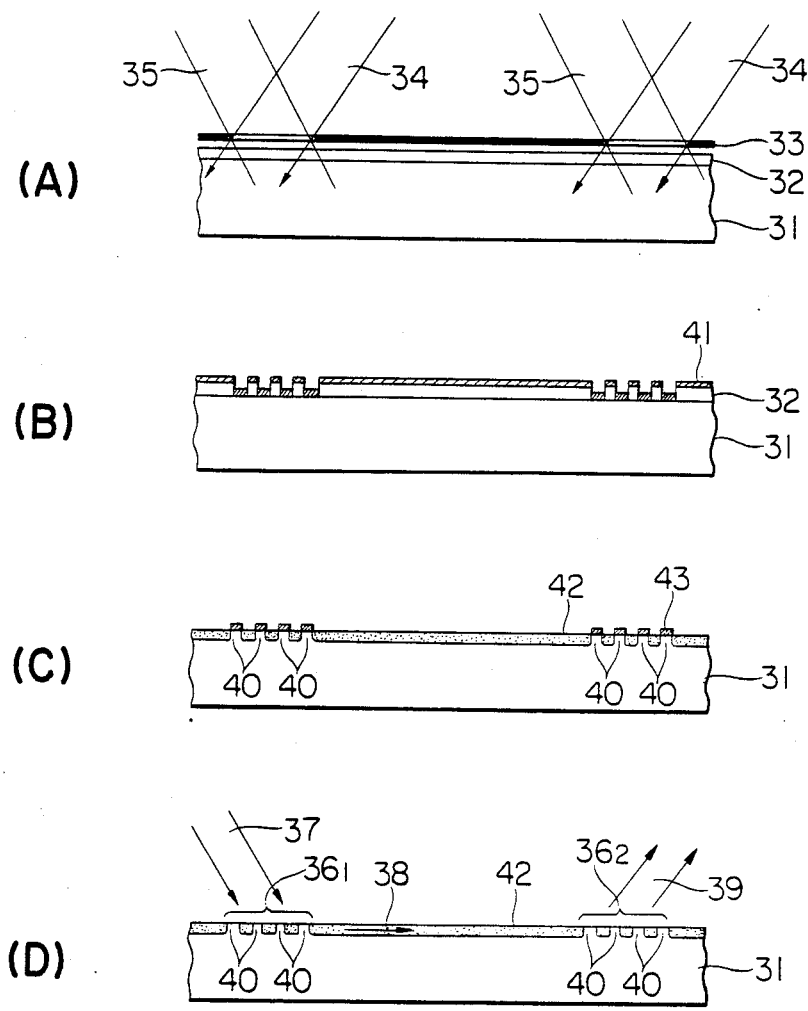
FIGS. 3(A), 3(B), 3(C) and 3(D) are schematic cross-sectional views showing the integrated optical circuit element of the present invention and the process of making the same.

FIGS. 3(A), 3(B), 3(C) and 3(D) correspond to the cross-section taken along the line A-A' in FIG. 1. The integrated optical circuit element of the present invention, as shown in FIG. 3(D), comprises a substrate 31, and a wave guide layer 42 having a refractive index higher than that of the substrate and formed on the substrate except for diffraction grating patterns 40 to thereby form photocouplers $36_1$ and $36_2$. An incident light 37 having entered this integrated optical circuit element at a suitable angle is introduced into the wave guide layer 42 forming a wave guide, at a high coupling efficiency by the photocoupler $36_1$ and is propagated therethrough as a propagated light 38. This propagated light 38 is led out as an emergent light 39 at a good coupling efficiency by the photocoupler $36_2$.

Description will now be made of a method of making the above-described integrated optical circuit element. First, as shown in FIG. 3(A), a photoresist layer 32 is uniformly applied onto the substrate 31 as by a spinner, and then a mask 33 which transmits light only at portions thereof forming the photocouplers is overlaid on the photoresist layer 32, and a coherent light emitted from a laser light source is divided into two light beams 34 and 35 for exposure, which are caused to interfere with each other at an appropriate angle, whereby a pattern of interference fringes is exposed to light in the photoresist layer 32. When the photoresist layer 32 is developed, only the portions of the photoresist exposed to light in the light portion of the interference fringes are melted and removed, and gratings of the photoresist are formed in the portions in which photocouplers are to be formed, as shown in FIG. 3(B). Subsequently, a mask member 41 which does not pass ions or the like therethrough is formed on the entire surface of the photoresist layer, whereafter the photoresist 32 is dissolved in acetone solution and only the mask member resting on the photoresist is lifted off, whereby gratings 43 comprising the mask member are formed as shown in FIG. 3(C). Subsequently, when ions or the like are introduced into the substrate from outside, a wave guide layer 42 having a refractive index greater than that of the substrate is uniformly formed on the portion in which the gratings 43 are absent. Also, in the portions in which the gratings 43 are present, the introduction of the ions or the like is blocked and in the substrate immediately beneath the gratings 43, portions having the same refractive index as that of the substrate are periodically left as diffraction grating patterns 40. Finally, when the gratings 43 on the wave guide layer 42 are removed, photocouplers $36_1$, $36_2$ and a wave guide comprising the wave guide layer 42 are made at a time, as shown in FIG. 3(D).

Reference is now had to FIGS. 4(A)-4(D) to describe a method of forming an electrode like the MTF array 7 of FIG. 1, for example, simultaneously with the photocouplers in the integrated optical circuit element of the present invention. The cross-section of FIGS. 4(A)-4(D) corresponds to the cross-section taken along the line B-B' in FIG. 1.

Figure 4A:
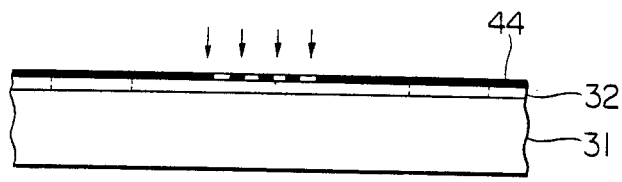
FIGS. 4(A), 4(B), 4(C), and 4(D) illustrate a method of forming an electrode like the MTS array of FIG. 1 simultaneously with photocouplers.
Figure 4B:
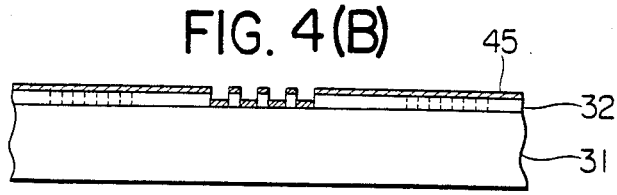
Figure 4C:
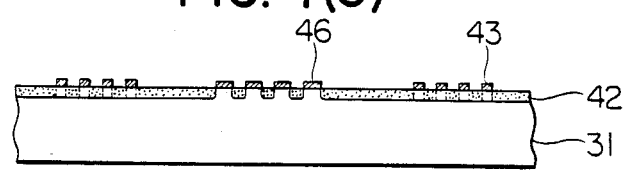
Figure 4D:
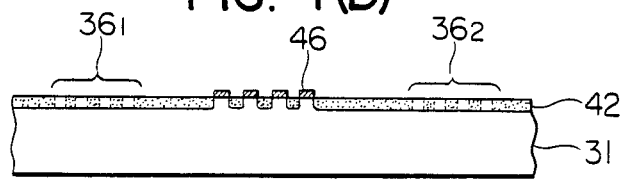

First, in the same manner as in the case of FIG. 3(A), diffraction grating patterns are exposed to the photoresist 32 on the substrate 31 as indicated by broken lines, whereafter the negative mask 44 of an electrode is adjusted to a predetermined position as shown in FIG. 4(A), and is brought into intimate contact with the photoresist by an aligner and the pattern of the electrode is printed on the same photoresist 32. The photoresist used in this case may desirably be positive resist. It is also desirable that the exposure of the diffraction grating patterns and the exposure of the electrode pattern be effected in the same yellow room. Further, the order of the exposure of the diffraction grating patterns and the exposure of the electrode pattern may be reversed. Subsequently, when the photoresist is developed, the diffraction grating patterns and the electrode pattern are formed at a time as shown in FIG. 4(B). Thereafter, if a mask member 45 which does not pass ions or the like therethrough is mounted on the entire surface of the photoresist and is lifted off by acetone, gratings 43 comprising the mask member and an electrode 46 are formed on the substrate 31 as shown in FIG. 4(C). When ions or the like are then introduced into the substrate from outside, the ions or the like are uniformly introduced into the portions in which the gratings 43 and the electrode 46 are absent, whereby a wave guide layer 42 having a refractive index greater than that of the substrate is formed. Further, if the electrode 46 is masked by photoresist or the like and only the gratings 43 are removed by means such as etching and then this photoresist or the like is removed, an integrated optical circuit element provided with photocouplers $36_1$, $36_2$ and electrode 46 is made as shown in FIG. 4(D). In FIG. 4, the schematic cross-section in the electrode forming portion is shown like the cross-section B-B' of FIG. 1 and therefore, the wave guide layer appears to break, but the electrode 46 is usually installed outside the line passing through the two photocouplers $36_1$ and $36_2$ and thus, the layer of high refractive index is continuous in the zone through which light is propagated. The mask member 45 which forms the electrode 46 should desirably be a metal film, but it may be, for example, a transparent electrode material or the like if it is electrically conductive. Thus, according to the present invention, an integrated optical circuit element provided with an electrode like the light deflector of FIG. 1 can be made inexpensively by a small number of manufacturing steps.

In the above-described example, if the portion into which ions or the like have been introduced becomes greater in refractive index than the substrate, the kind of the substance to be introduced is not limited to ions, but may of course be any one such as protons, electrons or atoms. Also, the method of obtaining a mask of diffraction grating pattern is not restricted to the method using an interference fringe.

On the basis of the present invention, it is also possible to make a number of integrated optical circuit elements such as the light deflector shown in FIG. 1 at a time and thereby greatly reduce the unit cost of the elements. In such case, a mask on which a number of diffraction grating patterns or electrode patterns are arranged may be prepared or the patterns of the mask may be repetitively exposed at different locations on the substrate as by a stepper and a process similar to what has been described may be executed to thereby form a plurality of integrated optical circuit elements on the same substrate, and the individual elements may be cut to predetermined dimensions as by a disco cutter.

Some embodiments of the present invention will be shown below.

EXAMPLE 1

One surface of an x plate (having a thickness of 0.5 mm) of $LiNbO_3$ single crystal having a diameter of 3 inches was polished, and then was subjected to the conventional ultra-sonic washing, and this plate was used as a substrate. The direction in which light is propagated was defined as y-direction, and fifty integrated optical circuit elements each having a dimension of 12 mm in y-direction and a dimension of 6 mm in z-direction were made in an $LiNbO_3$ wafer at a time. A pair of photocouplers for introducing light and leading out light, respectively, were made in each of the integrated optical circuit elements at a time during the making of a wave guide. A window of 3 mm×3 mm for passing light therethrough to the portion forming the photocouplers was preformed as a Cr blank on a glass plate formed with a Cr film, this plate was overlaid as a mask on the substrate, two parallel light beams divided from an Ar laser light source were overlapped with each other at an angle of 52°, and a grating of pitch 0.42 $\mu$m was exposed in photoresist (having a thickness of 2000 Å) applied to the entire surface of the $LiNbO_3$ substrate by a spinner, whereafter the photoresist was developed by AZ developing liquid, whereby a grating comprising the photoresist was formed.

After the photoresist was developed, dry etching was effected in a gas atmosphere of $O_2+CF_4$ (mixture ratio of 4:1) and the remaining resist film was removed. Thereafter, an Al film was deposited by evaporation to a thickness of 2000 Å on the entire surface of the photoresist in vacuum of $1\times10^{-6}$ Torr and the photoresist was dissolved in acetone solution, and by the so called lift-off method, a grating comprising the Al film was formed on the $LiNbO_3$ substrate. Subsequently, the $LiNbO_3$ substrate having the grating comprising the Al film was immersed in benzoic acid melted at 250° C. for twenty minutes to form a waveguide and a photocoupler. At this time, the Al grating on the $LiNbO_3$ substrate acted as the mask of the proton exchange method which prevented the protons supplied from the benzoic acid from being substituted for the Li in the substrate or from entering the Li lacking grating point, and in the portion in which the grating was absent, a uniform wave guide having a refractive index higher by about 0.1 than that of the $LiNbO_3$ substrate was formed by proton exchange. In the case of the present embodiment, it was found that the thickness of the wave guide formed by the proton exchange by benzoic acid at 250° C. and for twenty minutes is 2 $\mu$m and the wave guide has four optical modes, i.e., $TE_0$, $TE_1$, $TE_2$ and $TM_0$. Likewise, the Al grating acted as a mask and the portion in which gratings of a refractive index difference 0.1 adjacent to each other at a pitch of 0.42 $\mu$m were obtained by the proton exchange method became a diffraction grating type photocoupler. After the proton exchange, the solidified benzoic acid was removed in warm water (60° C.), and subsequently the Al grating was removed by Al etching liquid, whereafter fifty elements were obtained by cutting by a disco cutter.

The light propagation loss of the wave guide formed by the above-described manufacturing method was 1.5 dB/cm (the wavelength of the measuring light: 6328 Å), which is greater than the light propagation loss 0.5 dB/cm (the wavelength of the measuring light: 6328 Å), of the conventional wave guide formed by diffusing Ti in $LiNbO_3$ crystal at 1000° C., but when the entire surface of said element was subjected to the annealing process by $CO_2$ laser or the like the light propagation loss could easily be reduced to the level of 0.5 dB/cm. In the present embodiment, the proton exchange method was employed as the wave guide forming means, but of course, means such as the metal diffusion method or the ion introduction method may also be adopted if an appropriate mask material is chosen.

EXAMPLE 2

As in Embodiment 1, a $LiNbO_3$ substrate having a diameter of 3 inches was used and washed in the same manner, whereafter fifty integrated optical circuit elements each having an MTS array and having the same element dimensions were made on the $LiNbO_3$ wafer at a time. Also, a pair of photocouplers as shown in FIG. 1 were formed on each of the integrated optical circuit elements. To form the elements, a grating of pitch 0.42 $\mu$m was exposed, in the same process as in Embodiment 1, only to the portions of each integrated circuit element in which the photocouplers were formed, whereafter the negative mask of the MTS array was brought into intimate contact with the substrate and UV-exposed, and thereafter it was developed to thereby form a diffraction grating and MTS array patterns. Thereafter, Al was deposited by evaporation on the entire surface of the substrate as the mask during the proton exchange, and MTS array electrodes and grating masks for forming the photocouplers were formed on the $LiNbO_3$ substrate. The thickness of the Al film was 2000 Å. Thereafter, proton exchange at 250° C. was effected for ten minutes by the use of benzoic acid, and a wave guide having a thickness of 1 $\mu$m and having a refractive index greater by about 0.1 than that of the substrate was formed in a portion of the substrate in which the Al mask was absent. In this case, the wave guide optical modes were three modes, i.e., $TE_0$, $TE_1$ and $TM_0$, and the light propagation loss was 1.2 dB/cm (the wavelength of the measuring light: 6328 Å). Also, a grating of pitch 0.42 $\mu$m was formed as a photocoupler in the wave guide. Further, to remove only the Al grating of the photocoupler portion, photoresist was again spin-applied (to a thickness of 5000 Å) to the entire surface of the substrate, and then mask exposure was effected to thereby form photoresist as a protective layer only in the MTS array electrode portion. Thereafter, the Al grating in the photocoupler portion was removed by Al etching liquid, and subsequently the protective photoresist layer was removed by acetone, whereafter elements were cut down. In the process after the removal of the photoresist, dry etching was effected by $O_2+CF_4$ (mixture ratio of 4:1) and the remaining resist film was completely removed. This was particularly preferable in the present embodiment. When He-Ne laser light was caused to enter the photocoupler at an angle of 45° after the elements were made, a coupling efficiency of 30% was obtained and, by supplying RF power to the MTS arrays while varying the frequency thereof sequentially, the light led out into the air from the other coupler could be scanned. In this case, the element throughput (the rate of the emergent light to the incident light) was as good as 15%.

In the foregoing description, a light deflector using the acousto-optic effect has been mentioned as an example of the integrated optical circuit element, whereas the present invention is not restricted thereto, but is applicable to various elements such as light modulators, switching elements and elements using the electro-optic effect.

What we claim is:

1. An integrated optical circuit element comprising:
   a substrate having a surface region;
   a waveguide layer formed in said surface region of said substrate and having a refractive index higher than that of said substrate;
   a photocoupler which consists of a diffraction grating pattern formed in said waveguide layer and having the same refractive index as that of said substrate, said photocoupler being formed by covering a portion of said substrate with a mask of diffraction grating pattern of an electrically conductive material at the time of forming said waveguide layer and afterwards removing the mask; and
   a mounted type electrode for modulating or deflecting light propagated through said waveguide layer and disposed on top of said waveguide layer, said electrode being formed of said electrically conductive material simultaneously with said mask.

2. An integrated optical circuit element according to claim 1, wherein said electrode is an interdigital transducer generating a surface acoustic wave which causes light propagated through said waveguide layer to be diffracted.

3. An integrated optical circuit element according to claim 2, wherein a plurality of said interdigital transducers are arranged to form a multiple tilted surface acoustic wave transducer array.

4. An integrated optical circuit element according to claim 1, wherein said electrode is formed of an Al film.

5. An integrated optical circuit element according to claim 1, wherein said substrate comprises $LiNbO_3$ single crystal and said waveguide layer is formed by protons being substituted for the Li in said substrate or entering an Li-lacking grating point.

* * * * *